United States Patent
Viaud

(10) Patent No.: US 7,467,507 B2
(45) Date of Patent: *Dec. 23, 2008

(54) MODULAR BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 720 days.

This patent is subject to a terminal disclaimer.

(21) Appl. No.: 11/039,168

(22) Filed: Jan. 20, 2005

(65) Prior Publication Data
US 2005/0160713 A1 Jul. 28, 2005

(30) Foreign Application Priority Data
Jan. 27, 2004 (EP) .................. 04001654

(51) Int. Cl.
A01D 39/00 (2006.01)
(52) U.S. Cl. .......................... 56/341; 100/88
(58) Field of Classification Search ............ 56/341, 56/343–360; 100/88
See application file for complete search history.

(56) References Cited

U.S. PATENT DOCUMENTS 4,870,812 A * 10/1989 Jennings et al. ............ 56/341
5,819,516 A * 10/1998 Anderson et al. ........... 56/341
6,164,050 A * 12/2000 Vande Ryse et al. ........ 56/341
6,651,418 B1 * 11/2003 McClure et al. ............ 56/341
2003/0029331 A1   2/2003 Boucher et al.

FOREIGN PATENT DOCUMENTS

| DE | 27 44 548 | 4/1979 |
| DE | 40 12 755 | 10/1991 |
| EP | 258528 A1 * | 3/1988 |
| EP | 0 865 723 | 3/1998 |
| EP | 1 151 657 | 11/2001 |

OTHER PUBLICATIONS

Brochure "Uni-Combi G 5040", Universal Combination Round Bale Wrapper, By Göweil, Nov. 27, 2002, 6 Pages.

* cited by examiner

Primary Examiner—Alicia M Torres

(57) ABSTRACT

A large round baler includes a wheeled chassis constructed as a separate unit including a tow bar adapted for connection to a tractor. Also constructed as separate units that are releasably secured to the chassis are a baling assembly and a crop receiving and/or processing assembly. The baling assembly is constructed in such a way that, by separating the baling assembly from the chassis either in its entirety or by tilting it about a longitudinal axis defined at a connection at one side of the chassis, baling belts may be moved over the entire periphery of the baling assembly and mounted into engagement with baling element support rolls forming part of the baling assembly.

8 Claims, 4 Drawing Sheets

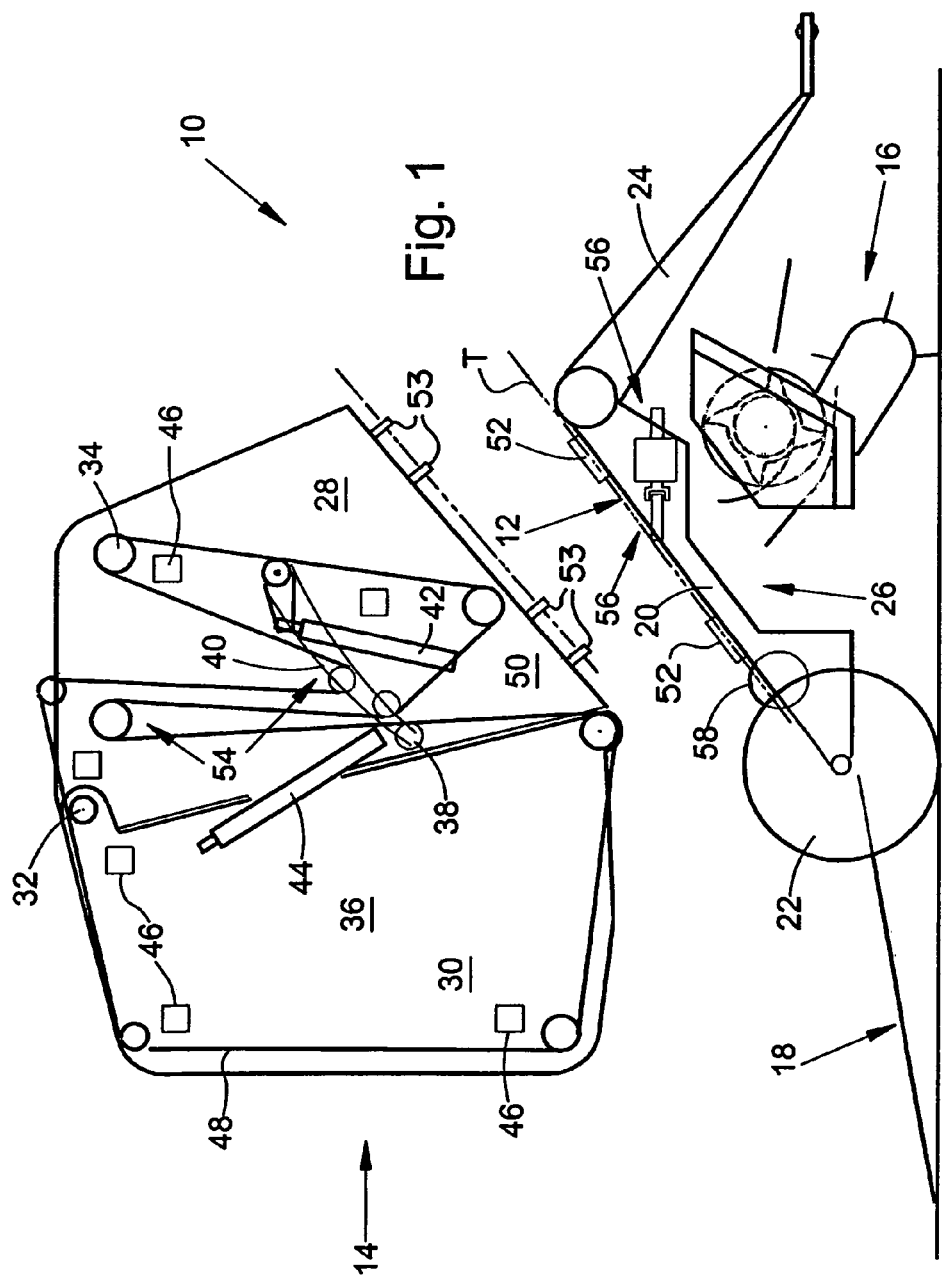

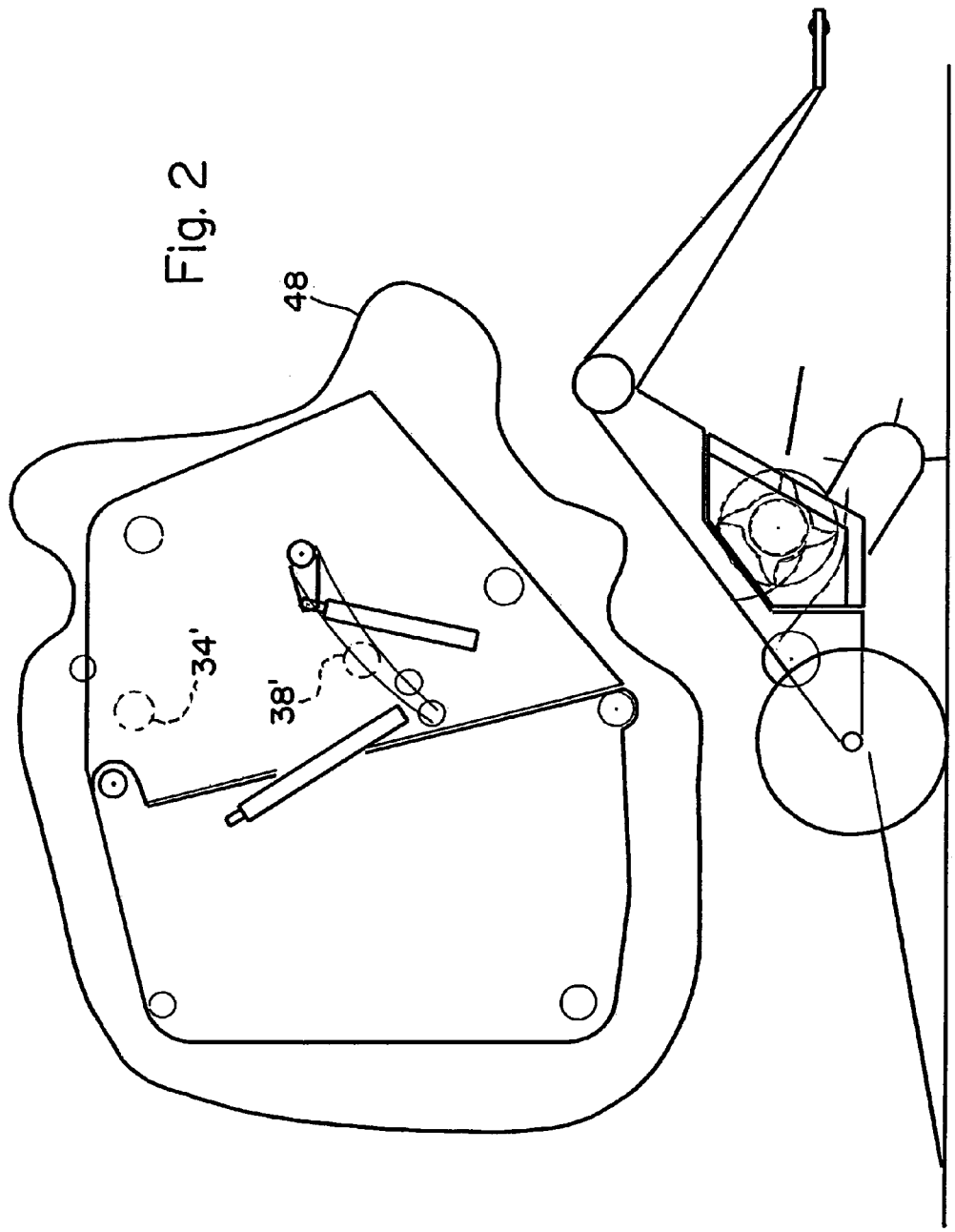

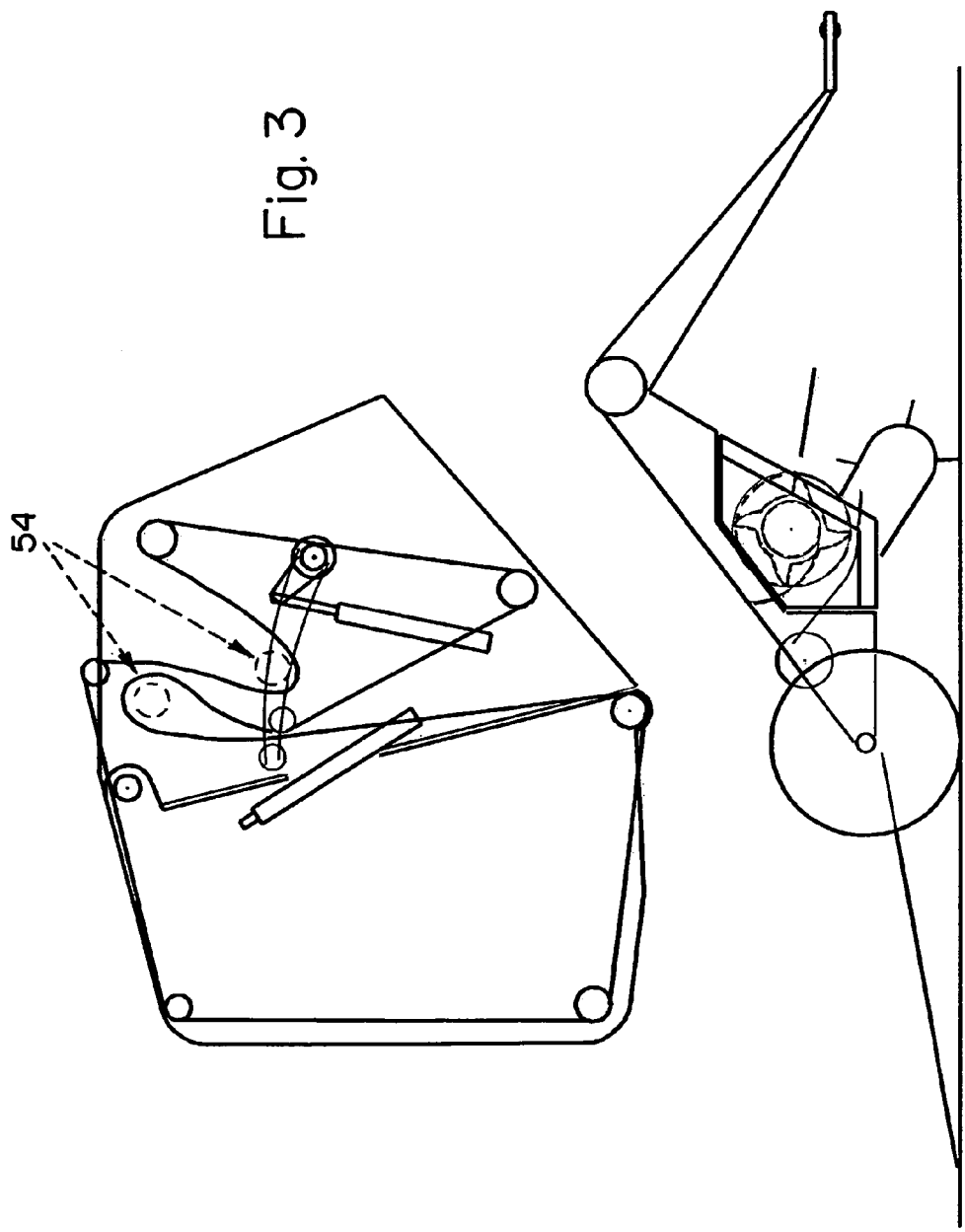

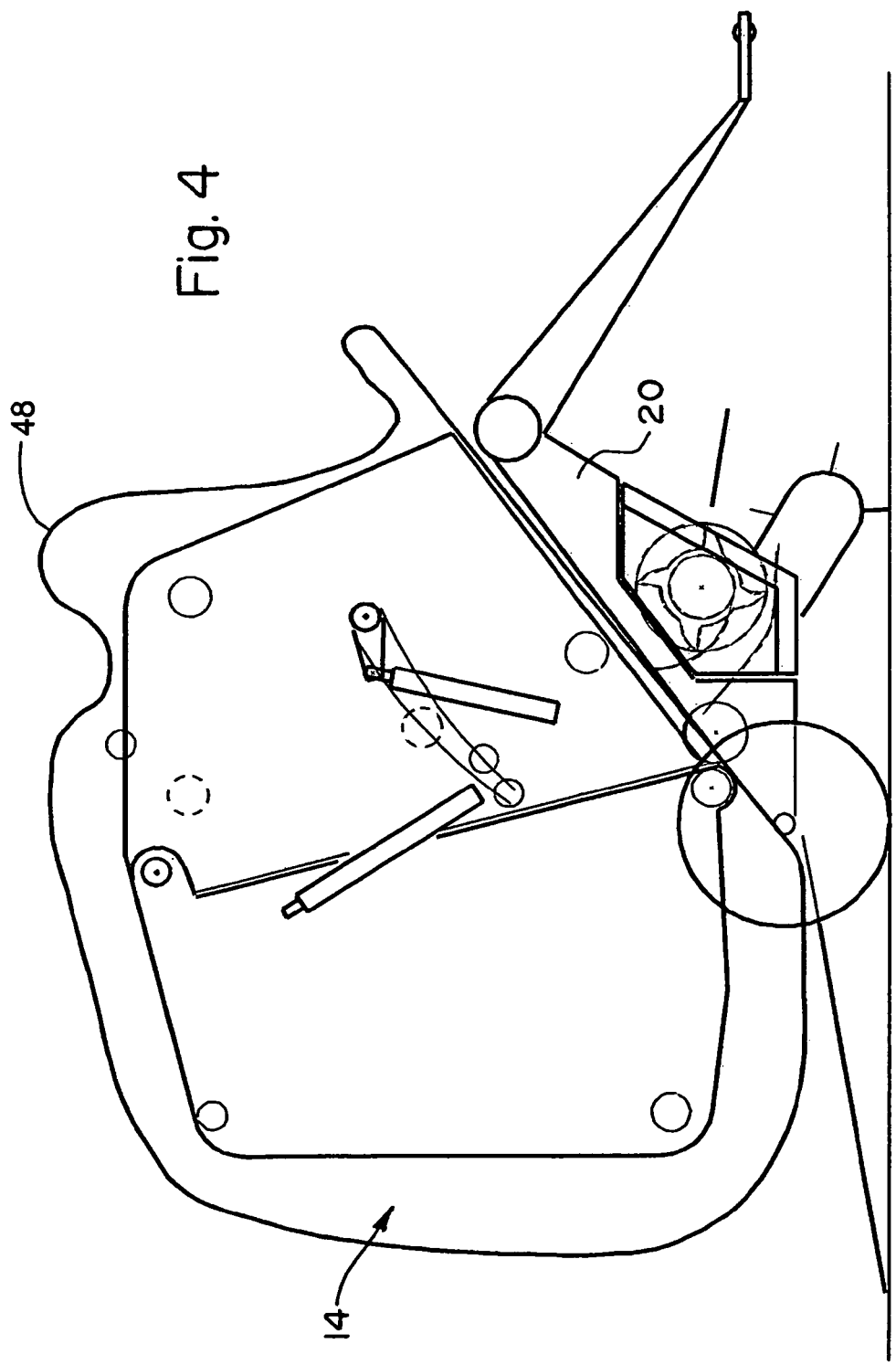

MODULAR BALER

FIELD OF THE INVENTION

This invention relates to a baler, in particular round baler, comprising a chassis, a baling assembly and a crop receiving and/or processing assembly.

BACKGROUND OF THE INVENTION

EP-A1-0 865 723 discloses a chassis on the top of which is located a round baler and a wrapping assembly. The round baler is an ordinary round baler of which the axle has been taken away, and whereas the flanges for the axle are used for the connection to the chassis.

It is also known from Göweil (Göweil Uni-Combi G 5040), to use a chassis carrying a round baler and a wrapping assembly, whereas the chassis is connected by means of a tongue to a tractor. Although in this case the tongue of the round baler is removed, the round baler is designed to assume all loads of a vehicle.

The problem this invention is based on is seen in the efforts needed to make the round baler strong enough to assume all loads applied to this vehicle or in redundant strength.

SUMMARY OF THE INVENTION

According to the present invention, there is provided an improved large round baler construction.

An object of the invention is to provide a large round baler constructed so that draft loads are not transferred through the bale forming assembly of the round baler. This object is accomplished by building the baler in a modular configuration.

By means of this teaching of a modular baler concept, the baling assembly is a self-sufficient assembly, which has to be designed only to assume the baling forces. It is not necessary to assume the bending forces in the whole vehicle. Bolt connections and bearings will not be applied by forces to be encountered by the vehicle portion of the baler. The baler may be a large square baler as well as a round baler. Accordingly, the baling assembly may be a rectangular bale case or a variable or fixed bale chamber of a round baler with a round cylindrical space, when the bale is completed. The chassis is pulled behind a prime mover, like an agricultural tractor and is provided with the number and type of wheels and axles, which are needed to carry the load of the whole vehicle. The tongue is not connected to the baling assembly but to the carrying structure. The tongue may be adjustable in height or fixed. The same chassis may be used for various types and sizes of balers, which allows a low cost production. Crop receiving and/or processing assemblies can be produced in various sizes and capacities, like wide or narrow pick-ups, short or long cut cutting devices etc.; they all would use the interface on the carrying structure. The carrying structure may also carry all the drives and power lines, like hydraulic lines, electric lines, etc., which are connected to the individual assemblies.

All known types of crop receiving and/or processing assemblies, like pick-ups, cutting means, windrowing means, humidifying means, etc. can be attached to the carrying structure either alone or in combination with each other. Height adjustment devices, like hydraulic actuators would act between the carrying structure and the respective crop receiving and/or processing assembly to move it into one or several operative positions and into an inoperative position.

The crop receiving and/or processing assembly may be formed such, that it reinforces the carrying structure, when it is attached to it. Means to reinforce the carrying structure are seen in a strong frame of the crop receiving and/or processing assembly, in additional struts or braces, in the way the crop receiving and/or processing assembly is attached to it, and the like. This will make the whole assembly more stiff without increasing the strength of any of these components.

If desired, bale handling assemblies can be attached to the carrying structure, like a bale wrapping means, a bale weighing means, a bale unloading means, a bale tying or netting means, etc., again either alone or in combination with each other.

Since with known balers it is normally a front part, which does not need adoption to another size or type of the rear part of the baler, it reduces assembly efforts, if said front part is fixed to the carrying structure, whereas a rear part is adapted to and fixed to said front part. For example, a round baler may have a front part with rolls or belts, to which may be attached one of a set of different rear parts, with belts, rolls, chains, etc. to create either a fixed or a variable chamber round baler. In the case of a large square baler the drive portion may reside in the front part, whereas the bale case of different sizes or strength may be attached to said front part. This however does not exclude, that both—the front and the rear part—are attached to the carrying structure, such that in the case of a round baler the rear part is hinged to the carrying structure rather than to the front part.

In a case, in which the baling assembly has walls, normally side walls, between which extend struts or cross beams to form a substantially rigid structure and rolls rotatably journalled in said walls to receive belts, whereas the cross beams are offset from the path of the belts towards the interior of the round baler, it is possible to install these belts like a ring slid over the circumferential surface of the baling assembly. These belts are brought in place and pressed onto the rolls by other rolls moved from the circumference inwardly and fixed in the operative position. This allows to use either endless belts or finite belts, the ends of which are connected to each other.

The belts can be pressed onto the rolls and the lately installed rolls to press the belts on the rolls already in place, can be brought in place in a fixed structure of the baling assembly, if some of the rolls are replaceable while the walls are in place, in particular by means of shafts or stub shafts connectable to a roll body.

The belts can be taken from the rolls or put onto them without routing them in a cumbersome way through the spaces between the rolls, if they are slid like a ring over the circumference of the baler. This circumference can be freed by disconnecting the whole baling assembly from the carrying structure and by lifting it therefrom by means of a crane or the like. Or access can be provided, if the baling assembly is hinged to the carrying structure such, that it can be tilted laterally about an axis extending substantially in the longitudinal direction of the baler. Latter solution does not require a crane but could be performed also with a jack stand or hydraulic actuator. The baling assembly would always remain connected to the carrying structure and could easily be returned to the initial position. Different from prior art balers the baling assembly would be free on any other assembly, including pick-up and netting or tying means, which allows to install the belts or even a slat-chain conveyor as an endless ring.

A tilting movement or even a removal of the baling assembly from the carrying structure is easy to accomplish, if the drives are easy to disconnect, like with chains, universal joint shafts, clutches etc., when disconnection is needed. Alternatively, hydraulic hoses and couplings may be used. If the drives are present on the side, where the baling assembly is hinged to the carrying structure, universal joint shafts, universal joints, hydraulic or electric cables or the like may be provided, which retain the connection even in the tilted position.

BRIEF DESCRIPTION OF THE DRAWINGS

One embodiment of the invention is described in more detail below and in relation to the drawing.

FIG. 1 shows a baler in a schematic side view with the components disassembled.

FIG. 2 shows the baler of FIG. 1 in a partly assembled stage with loose endless belts surrounding the baling assembly.

FIG. 3 shows the baler of FIG. 2, but with the belts mounted and under tension.

FIG. 4 shows the baler of FIG. 2, but with the baling assembly being moved away from the carrying structure by a short distance.

DESCRIPTION OF THE PREFERRED EMBODIMENT

FIG. 1 shows a baler 10, having a chassis 12, a baling assembly 14, a crop receiving and/or processing assembly 16 and a bale handling assembly 18.

The baler 10, as shown, is in the form of a round baler of the variable chamber type. However, the baler could be as well a round baler of the fixed or mixed chamber version or a large square baler. The baler 10 is of the pull type, i.e. it gets attached to a tractor (not shown) or the like and is pulled during operation and transport.

The chassis 12 comprises a carrying structure 20, wheels 22 and a tongue 24. The chassis 12 is of a self-carrying structure to which all assemblies of the baler 10 can be attached.

The carrying structure 20 is made of beams, traverses, struts, axles, cross beams, etc. welded or bolted together to form a rigid piece. The carrying structure 20 is formed such, that it can assume in an inner space or on its top side the baling assembly 14, at its underside the crop receiving and/or processing assembly 16 and normally at the back side or above the crop receiving and/or processing assembly 16 a bale handling assembly 18. The bale handling assembly 18 could be installed on any place which fits the purpose. Flanges or other interface connecting means are provided at places which are useful to receive either of the above assemblies 14, 16, 18. In the shown embodiment, the carrying structure 20 extends under an angle of about 45 degrees to the ground on which it stands and is connected to the tongue 24 at one end and to the wheels 22 at the other end. Two beams (only one shown) extend on each side in the longitudinal direction of the baler 10 and are interconnected by means of cross beams (not shown). Provided at the underside of the carrying structure 20 is a recess 26 to provide additional space for the crop receiving and/or processing assembly 16. Such a recess 26 or additional space may not be needed in other embodiments. While the carrying structure 20 here is shown in straight lines, it is obvious that it may be of a different shape and layout, when this is necessary. Furthermore, the carrying structure 20 may be formed such that the baling assembly 14 is not fastened to its upper side, but is suspended from a portion high up. The carrying structure 20 is also provided with electronic controls (not shown) and drives 56 in the form of belts, chains, gears or hydraulic drives, whereas the one shown comprises a bevel gear with an universal joint. In a slight overlapping relationship to the wheels 22, a bottom roll 58 is rotatably received by the carrying structure 20. This bottom roll 58 is oriented and located such that it can support a round bale formed in this baling assembly 14.

The wheels 22 are rotatably connected to the carrying structure 20 either directly or via an axle (not shown). The wheels 22 may be arranged in tandem fashion, spring suspended or fixed, steerable or straight and with or without brakes. The arrangement of the wheels 22 is such that the baling assembly 14 in question can be readily connected to the carrying structure 20.

The tongue 24 is connected to the front end area of the carrying structure 20 in a vertically adjustable way. In other embodiments, the tongue 24 may be attached rigidly. Sufficient space is left below the tongue 24 and the carrying structure 20 to receive the crop receiving and/or processing assembly 16. Beyond that, the tongue 24 is of known construction.

The baling assembly 14 is formed by a front part 28 and a rear part 30, which are connected to each other in a bearing 32 with a pivot axis extending horizontally and transverse to the longitudinal direction of the baler 10. The baling assembly 14 is substantially of known type and in the form of a variable chamber round baler, in which a series of rolls 34 is rotatably received in side walls 36 and whereas other rolls 38 are carried by a tensioning arm 40 moving between end positions against the resistance provided by a tensioning means 42, like a spring or a hydraulic actuator. A hydraulic actuator 44 is provided to swing the rear part 30 about the pivot axle of the bearing 32 between a lowered baling position, as shown, and a raised unload position. This baling assembly 14 is formed as a self-carrying unit, which can be handled during assembly, transport etc. as a single and independent piece. For this purpose, struts and cross beams 46 are provided between and fixed to the side walls 36, to make the front and rear parts 28 and 30, respectively, rigid units. The baling assembly 14 is provided furthermore with a set of belts 48, running parallel with little distance to each other over the rolls 34 and 38. Unless the belts 48 are manufactured in an endless fashion, the ends of the belts 48 are connected to each other to make the belts 48 endless. In other embodiments the belts may be replaced by a chain and slat conveyor or by rolls or by a single belt. As can be seen in FIG. 1, the cross beams 46 are provided inside a space covered by the belts 48 and close to a fixed roll 34, such that, even with a completed bale in a bale chamber 50, the belts 48 will not touch the cross beams 46. The location of each of the cross beams 46 is chosen such that, if the belts 48 are slid over the baling assembly and are concentrated towards the bale chamber 50, they are always in the shadow of the rolls 34 and are facing the inner side of the belts 48 as opposed to their outer side. Some of the rolls 34' and 38' are either made of multiple parts with a shaft or stub shafts and a roll body, or they can be inserted through holes in one of the side walls 36. This location of the beams 46 and the use of such rolls 34', 38' are reasons why the belts 48 can be installed, as will be described later. The underside of the front part 28 forms an interface to be connected to the upper side of the carrying structure 20. In this specific embodiment, front and rear mounting or bearing plates 52 are provided at each side of the carrying structure and include aligned openings lying along a longitudinally extending tilt axis T. Fixed to lower edges of each of the opposite side structures 36 are front and rear pairs of mounting lugs 53 that are spaced for receiving the bearing plates 52 between them and when coupled to the bearing plates establish a hinge joint at the respective tilt axis T about which the baling assembly 14 can be tilted when the fasteners establishing the coupling between the front and rear plates 52 and lugs 53 at one side of the carrying structure 20 and baling assembly 14 are removed. Nevertheless, it would also be sufficient, instead of there being a pivot axis defined by the connection of the front part 28 with the bearings 52, to simply provide a bolted connection which may be disconnected so that the baling assembly 14 may be lifted, by a hoist or the like, so as to achieve a gap of at least about 0.02 m.

The crop and/or processing assembly 16 is formed as a pick-up with a subsequent cutting device combined to a single unit. In other embodiments it may be either of them or another crop receiving and/or processing assembly, like a mower. Usually this crop receiving and/or processing assembly 16 extends laterally beyond the carrying structure 20 and has a rearward delivery opening to feed the crop into the bale chamber 50. Contrary to the prior art this crop receiving and/or processing assembly 16 is not connected directly to the baling assembly 16 but to the carrying structure 20, where it is suspended in a vertically moveable way, as this is known. Guide sheets or the like will be provided—where necessary— to provide for a secure feeding of the crop along the feed path, when the crop receiving and/or processing assembly 16 is adjusted in height. Interfaces (not shown) are provided at the underside of the carrying structure 20 and on the upper side of the crop receiving and/or processing assembly 16 to connect both to each other, whereas connection may happen via fast connectors, bearings, flanges or the like. The crop receiving and/or processing assembly 16 may be formed such that it reinforces the carrying structure 20, when it is attached to it. Means to reinforce the carrying structure are seen in a strong frame of the crop receiving and/or processing assembly 16, in additional struts or braces, in the way the crop receiving and/or processing assembly 16 is attached to it and the like.

The bale handling assembly 18 is shown as a bale ramp, on which a bale can roll down, once the rear part 30 is swung up. Instead of or in addition to it a bale wrapper, a weighing device, a bale tying or netting device or the like could be attached to the carrying structure 20. The connection between the bale handling assembly 18 and the carrying structure 20 may be rigid or adjustable. The bale handling assembly 18 may include either means that is used to handle or process the bale as opposed to the crop not being formed to a bale yet.

It is obvious from the above description, that various baling assemblies 14 and crop receiving and/or processing assemblies 16 and/or bale handling assembly 18 can be attached to the underside, upper side or rear side of the carrying structure 20 respectively to form a series of different balers 10.

Reference is made to FIGS. 2 and 3 to describe the method for installing the belts 48.

When new belts 48 have to be placed on the rolls 34, 38, either during initial production or for maintenance, the baling assembly 14 is either swung about the axis of the bearings 52 to create a gap between the baling assembly 14 and the carrying structure 20 and the crop receiving and/or processing assembly 16 and the bale handling assembly 18 (see FIG. 4), or it is lifted completely for example by means of a fork lift or a crane, into a position as shown in FIGS. 2 and 3. In this situation, the circumferential surfaces of the baling assembly 14, i.e. its upper, lower, front and rear sides are freely accessible. All rolls 34, 38 are in place except those shown in dotted lines in FIGS. 2 and 3, which is the most forward one 38' on the tensioning arm 40 and the upper rearward one 34' in the front part 28. Loops 54 of the belts 48 are created between pairs of opposite rolls 34, 38, whereas the removable rolls 34', 38' serve as idling points for these loops 54. In order to install the belts 48, they are made endless and are slid over the side walls 36 to surround the circumferential surfaces, as shown in FIG. 2. As a next step, the missing rolls 34' and 38' are installed, which will tighten the loops 54 and apply all belts 48 to the adjacent surfaces of the rolls 34, 38. Finally, the tensioning means 42 is activated to provide for a tight connection. The situation in FIG. 4 is comparable to the situation in FIG. 2, with the difference being however that the distance between the baling assembly 14 and the carrying structure 20 and the crop receiving and/or processing assembly 16 and bale handling assembly 18 is much smaller and assumes a size which is needed in the case of maintenance or repair, which should be performed with the least effort. A small distance of about 0.02. to 0.1 m should be sufficient to install the endless belts 48 and can be reached by either lifting off the baling assembly 14 or by pivoting it about the axis defined at one side of the carrying structure at the connection of the front part 28 with the bearings 52.

Having described the preferred embodiment, it will become apparent that various modifications can be made without departing from the scope of the invention as defined in the accompanying claims.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. In a large round baler including a chassis, a baling assembly and at least one of a crop receiving or a crop processing assembly, the improvement comprising: said chassis being formed as a first unit and including a tongue, wheels and a carrying structure; and said baling assembly being formed as a second unit and including a bale chamber and said at least one of said crop receiving or processing assembly being formed as a third unit; and a first connection structure cooperating for releasably connecting said baling assembly to said carrying structure and a second connecting structure for releasably connecting said at least one of said crop receiving or crop processing assembly to said chassis.

2. The baler, as defined in claim 1, wherein said crop receiving assembly includes a pick-up and said processing assembly includes a cutting means.

3. The baler, as defined in claim 1, wherein said at least one of the crop receiving or the crop processing assembly includes structure which cooperates with that of said carrying structure so as to strengthen said carrying structure when coupled to it.

4. The baler, as defined in claim 1, and further including a bale handling assembly releasably attached to said chassis.

5. The baler, as defined in claim 4, wherein said bale handling assembly is a bale unloading means.

6. The baler, as defined in claim 1, wherein said baling assembly has a front part that forms an interface with said chassis and said first connection structure including coupling means located at said interface.

7. The baler, as defined in claim 6, wherein said baling assembly has opposite side walls joined together by a plurality of cross beams to form a substantially rigid structure; and a plurality of baling belt support rolls being rotatably journalled in said side walls; at least one flexible endless belt being entrained about said plurality of belt support rolls; said cross beams being located offset towards an interior of the baling assembly from a path of said at least one belt; and said side walls, in side view, having a perimeter of a length less than a length of said at least one flexible endless belt, whereby said at least one flexible endless belt may be passed over one or another of said opposite side walls by disconnecting said baling assembly from said interface and elevating said baling assembly relative to said interface so as to produce a gap between at least one of said opposite side walls and said interface which is sufficiently large so as to permit passage of said at least one belt.

8. The baler, as defined in claim 7, wherein said first connection structure defines at least one hinge joint between a lower front part of at least one of said opposite side walls and includes couplers which may be released to permit said baling assembly to be pivoted at said hinge so as to elevate said at least one of said opposite side walls a sufficient distance so as to permit passage of said at least one belt.

* * * * *